Dec. 25, 1962          J. C. BROWN                3,069,931
              UNIVERSAL MACHINING SPINDLE HEAD
Filed Jan. 25, 1960                           4 Sheets-Sheet 1
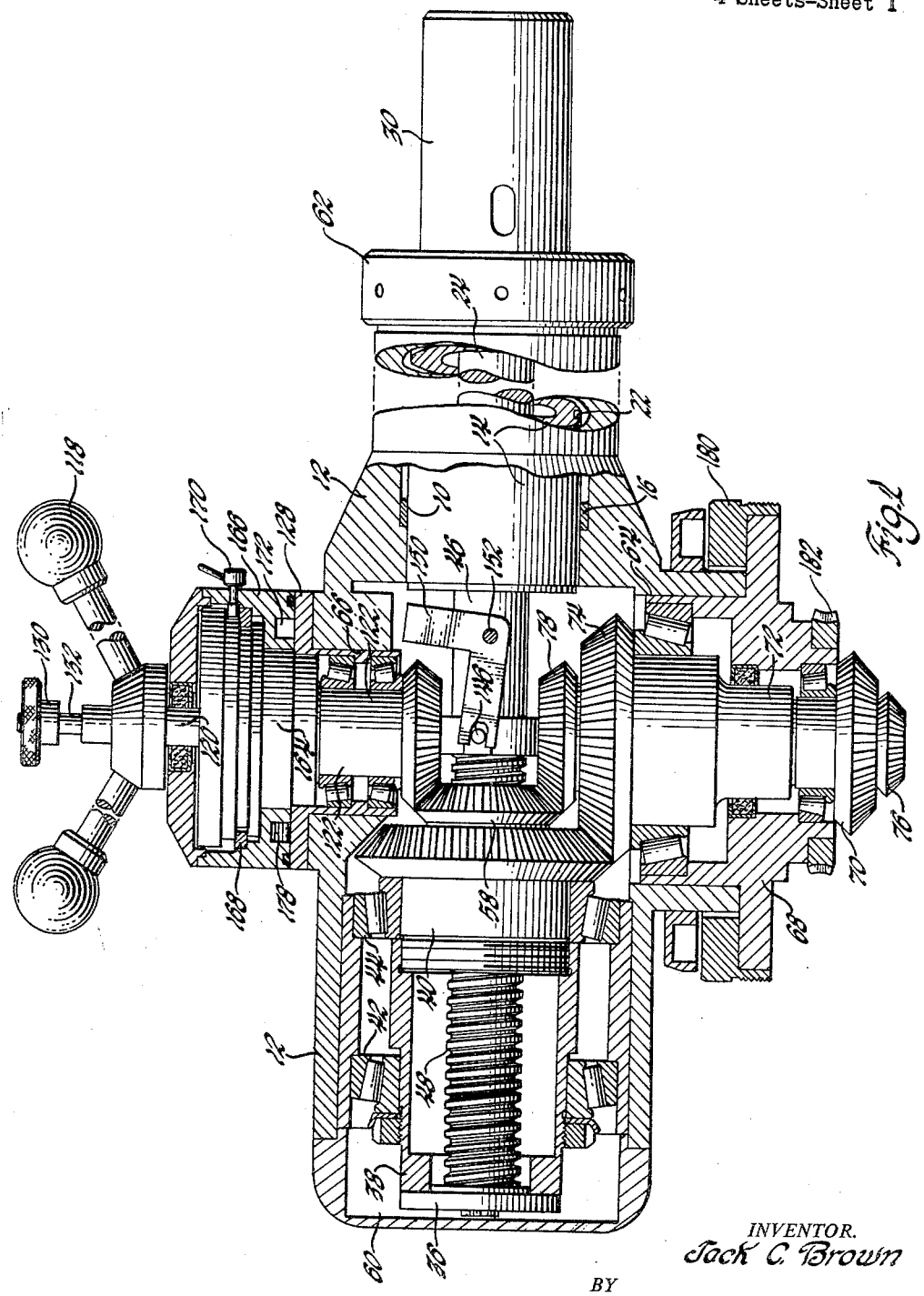
INVENTOR.
Jack C. Brown
BY
R. P. Barnard
ATTORNEY Dec. 25, 1962   J. C. BROWN   3,069,931
UNIVERSAL MACHINING SPINDLE HEAD
Filed Jan. 25, 1960   4 Sheets-Sheet 2
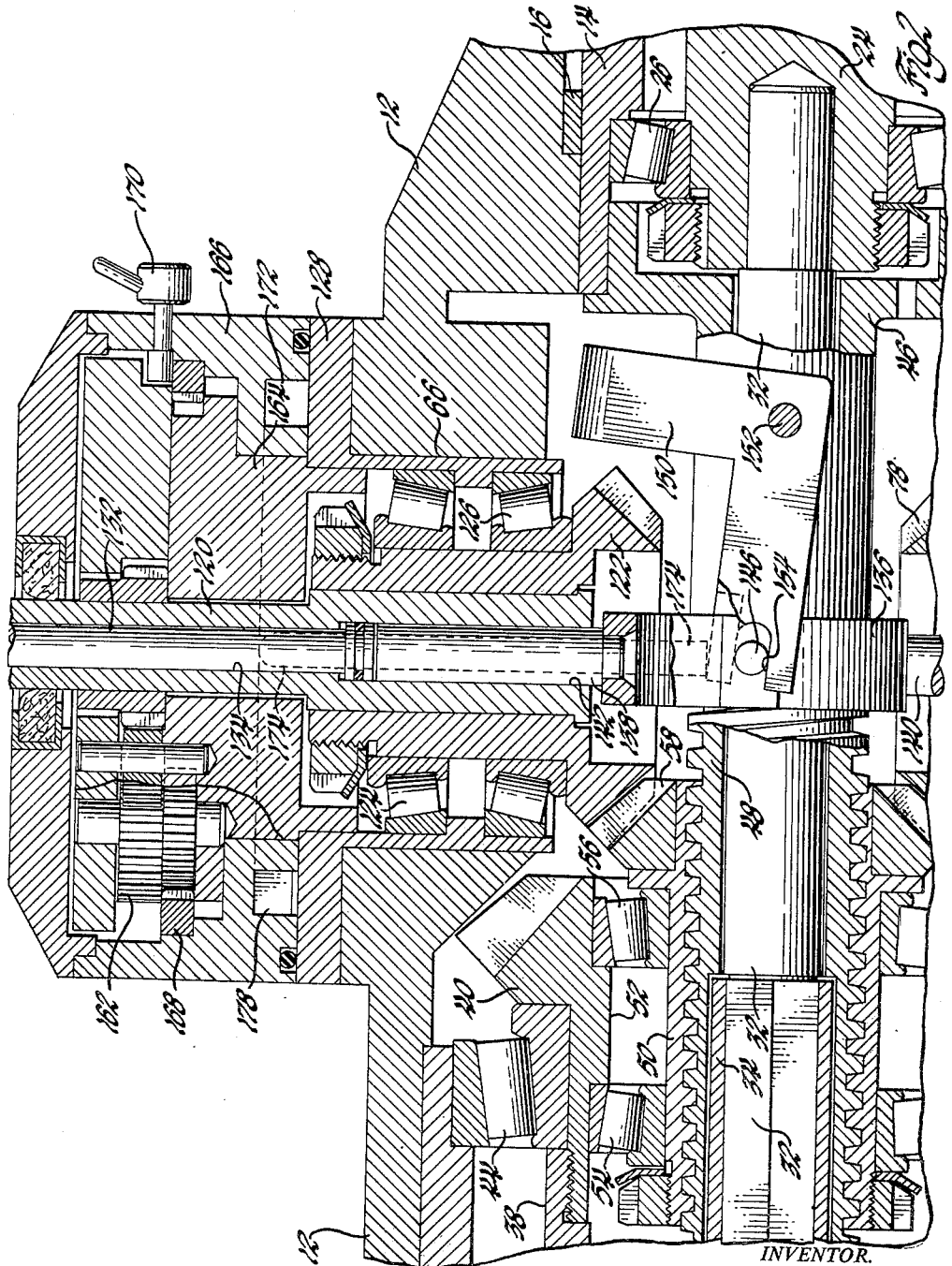
INVENTOR.
Jack C. Brown
BY
C. P. Barnard
ATTORNEY Dec. 25, 1962 J. C. BROWN 3,069,931
UNIVERSAL MACHINING SPINDLE HEAD
Filed Jan. 25, 1960 4 Sheets-Sheet 3
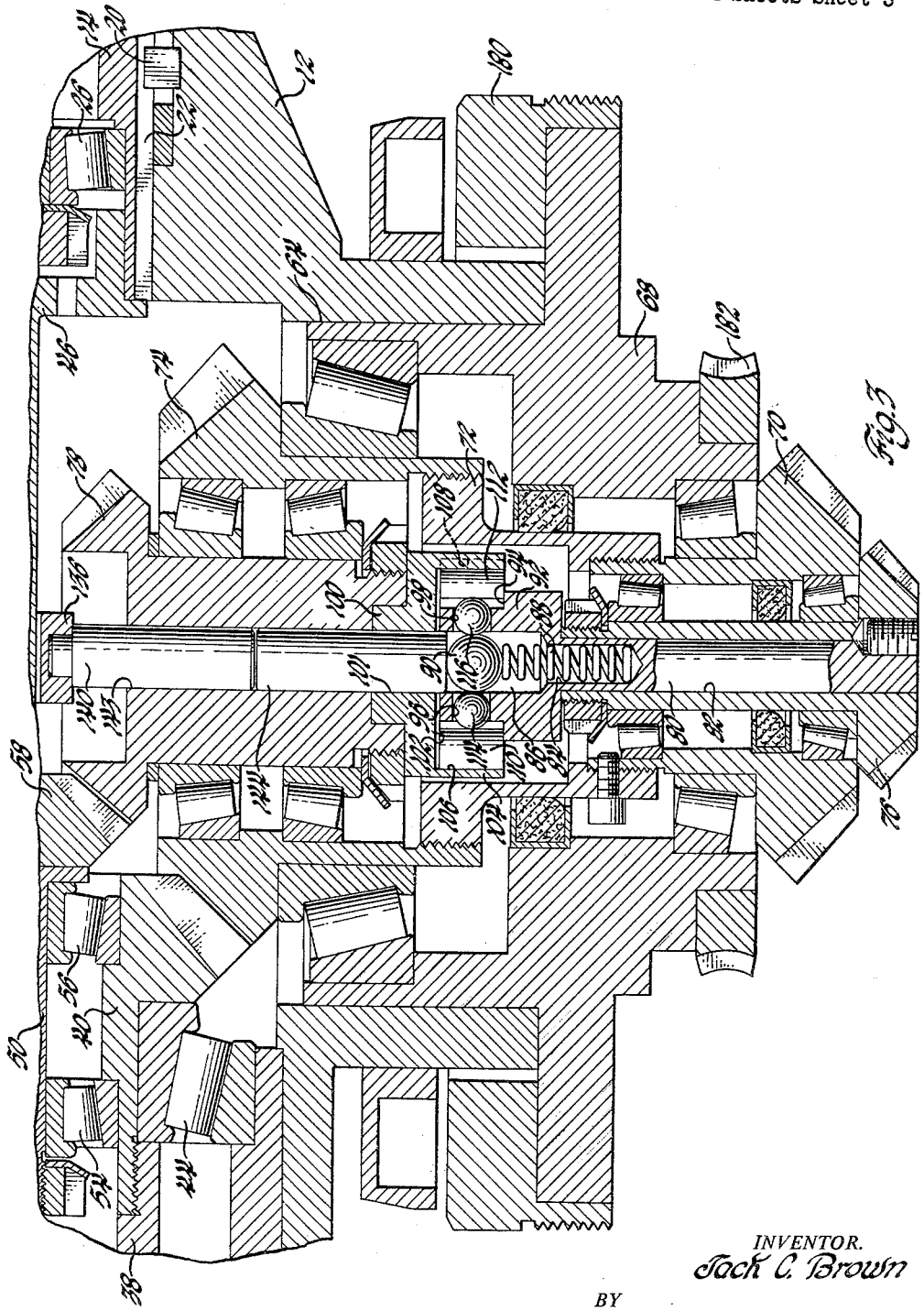
INVENTOR.
Jack C. Brown
BY
C. P. Barnard
ATTORNEY

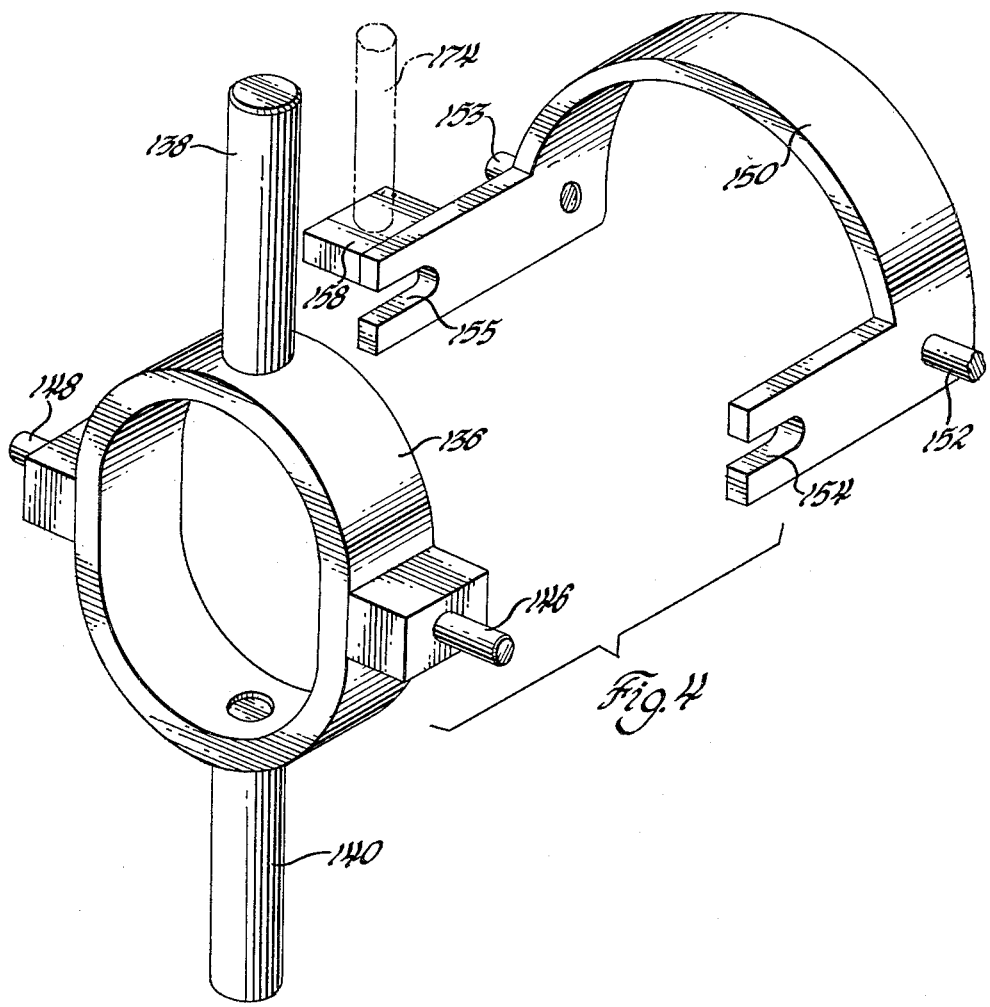

United States Patent Office 3,069,931
Patented Dec. 25, 1962

3,069,931
UNIVERSAL MACHINING SPINDLE HEAD
Jack C. Brown, Indianapolis, Ind., assignor to General Motors Corporation, Detroit, Mich., a corporation of Delaware
Filed Jan. 25, 1960, Ser. No. 4,508
16 Claims. (Cl. 77—34.7)

This invention relates to machining tool driving mechanisms and more particularly to a new and improved drill spindle head.

It has been recognized that a wide range of control features are desirable to best utilize modern machining equipment in combination with the abilities of the skilled machine operator. Thus, to give full scope to the abilities of the machine operator both a powered drive mechanism and a manually controllable drive mechanism are desirable so that the problem of economically constructing and integrating multiple drive mechanism becomes apparent. In addition, it is desirable to have automatic control means for power drive mechanisms and manual control means for both the power drive mechanism and manually operated drive mechanisms. Provision of equipment of this nature has, in previous practice, imposed a considerable burden on space requirements in order to obtain functionality of component parts that are integrally associated and easy to service.

It is, therefore, an object of this invention to provide a drive mechanism including two separate motion transmitting mechanisms, one of which is both power and manually operable and both of which are automatically and manually controllable and integrated in a simple, unitary housing providing a single control area and a single power supply area.

It is another object of this invention to integrate multiple controls in the spinlde head by concentrically disposing all component mechanisms so that a minimum of space is needed to house the various parts.

In accordance with the latter object it is a further object of the invention to provide clutch means which are adapted to the concentric disposition of the parts and interrelated to spindle controls.

Another object of this invention is to provide control mechanism situated in the most convenient manner but directly connected to the controlled means without interference with the other working parts.

A further object of this invention is to provide a simplified feed control readily adjustable to an unlimited number of settings.

Other objects of this invention include adaptation and arrangement of control mechanisms and drive mechanism so that the parts are securely held in operating engagement and supported in a manner to prevent excessive wear but to also conserve space and facilitate repairs.

The foregoing objects and purposes have been accomplished by providing a unitary housing containing a plurality of concentrically disposed operating systems and control units in a spindle head having a diameter approaching that required for only a simple spindle mechanism and, in addition, containing all of the control elements internally of the casing with a minimum of outwardly extending buttons, knobs, connections and other apparatus.

The advantages and novel features of this invention will become more apparent with reference to the accompanying drawing and the detailed description in which reference is made to:

FIGURE 1 illustrating a cross-sectional view of the preferred embodiment of my invention;

FIGURE 2 illustrating a detail view of the clutch control mechanism as shown in FIGURE 1;

FIGURE 3 illustrating a detail view of the clutch mechanism shown in FIGURE 1; and FIGURE 4 illustrating part of the control linkage in a perspective view.

Referring now to FIGURE 1 of the drawings, one end of a longitudinal bore 10 in a casing 12 slidably supports a feed sleeve 14 on a plurality of frictionless bearing members 16. A key 20 mounted in the casing 12 cooperates with a suitable key-way 22 to axially guide the feed sleeve. A rotatable spindle 24 is supported within the feed sleeve by a plurality of bearing members 26 and has a tool receiving collet 30 fixedly secured to the outer end thereof.

Drive mechanisms for the feed sleeve and the spindle are located centrally of the housing 12 and comprise a spindle drive shaft 32 fixedly secured at one end to the spindle 24 and provided with a drive sleeve 34 on the other end that is suitably connected thereto as by cooperating square-shaped portions. One end of the drive sleeve 34 is provided with a flange 36 that is locked to a connecting sleeve 38 concentrically mounted and radially spaced from the drive sleeve 34 and spindle drive shaft 32. The connecting sleeve 38 is drivingly connected to a hollow spindle drive spur gear 40 and both of these members are rotatably supported in the casing 12 by bearing members 42 and 44. The feed sleeve 14 is reciprocally connected by a flanged bushing 46 to feed drive mechanism located centrally of the casing 10 and comprising a jack screw 48 concentrically rotatably supported about the spindle drive shaft 32. A drive nut 50 is cooperably mounted and concentric with the jack screw 48 and rotatably supported within a bore 52 of the spur gear 40 by bearing members 54 and 56 and drivingly connected to a feed drive gear 58. A cover plate 60 closes one end of the longitudinal casing and a lock nut 62 retains the feed sleeve and spindle at the other end of the casing. Transverse access holes 64 and 66 are located centrally of the longitudinal casing and provide, respectively, a power source opening and a manual-power control opening.

A support plate 68 is secured within the opening 64 and rotatably supports powered spindle drive mechanism comprising a power driven hollow spur gear 70 suitably connected by a flanged bushing 72 to a power take-off spur gear 74 that is drivingly associated with the spur gear 40. The spindle drive gears are provided with enlarged central bores that rotatably accommodate the feed drive gearing comprising a power driven spur gear 76 and a power takeoff gear 78 drivingly associated with the jack nut drive gear 58. A clutch mechanism interconnects the spur gears 76 and 78 and includes a clutch member 80 fixedly secured within a central bore 82 of the power driven spur gear 76. The member 80 is provided at its inwardly extending end with an axial bore 84 and a counter bore 86 opening inwardly of the casing 12. A compression spring 88 is seated in the bore 84 and in turn seats a clutch control ball 90. The inwardly extending end of the clutch member 80 is provided with an enlarged portion 92 having its extremity reduced in cross section to provide a toroidal transverse surface 94. A plurality of transverse through holes 96 and 98 extend from the counterbore to the outer periphery of the reduced section of the end portion 92 of the clutch member. A clutch ring 100 is fixedly secured to the power takeoff gear 78 and includes a central bore 101 and a counter bore 102 that provides an axially extending, annular flange portion 104.

Pockets 106 and 108 are formed about the inner periphery of the flange 104 and accommodate roller members 110, 112 that are frictionally enagageable with ball members 114 and 116 seated in the transverse through holes 96 and 98. As will be noted, the roller members, the ball members and the control ball are axially aligned in the engaged position of the clutch member and the diameters of these members are totally greater than the inner peripheral dimension of the rim flange 104.

The other access opening 66 accommodates a manually operable hand feed mechanism including a feed wheel 118 connected through a drive sleeve 120 to a drive gear 122 that is supported in engagement with the screw nut gear 58. The manual drive is rotatably supported by bearing members 124 and 126 in a support bushing 128. Clutch control mechanism is internally mounted in the manual drive mechanism and comprises a control button 130 and a plunger 132 slidably retained in an axial bore 134 in the drive sleeve 120. The spindle drive shaft 32 and the feed drive mechanism are bypassed by a circumscribing ring member 136 provided with opposite transversely extending control shafts 138 and 140 that are slidably received within a bore 142 in the drive sleeve 120 and within a bore 143 in the power takeoff feed drive gear 78. A clutch operating pin 144 is slidably mounted in the bore 143 and in the axially aligned bore 101 in the clutch ring 100, and has an axial length sufficient to engage the clutch control ball 90 and provide a continuous link thereto from the control button 130. To accommodate radial displacement of the ring member 136, stub shafts 146 and 148 extend radially outwardly from the ring at right angles to the axis of the control shafts 138, 140. A swivel member 150 is pivotally connected to the casing by pins 152, 153 and is provided with slots 154, 155 for pivotal engagement with the stub shafts 146, 148. The swivel member 150 is also provided with an outwardly extending transverse flange portion 158 for a purpose to be hereinafter described.

Feed control means are also provided in the opening 66 and are concentrically mounted therein about the manual feed mechanism. A reduction gearing arrangement 162 is supported within the opening by a spacer plate 164 in any suitable fashion. A cam ring 166 is connected to the reduction gearing through a ring gear 168 that is drivingly engageable therewith by adjustment of a locking pin 170. A cam groove 172 is provided on the bottom surface of the cam ring and accommodates a knock-out pin 174 that extends into the casing 10 through a suitable hole. A portion 178 of the cam groove 172 is adapted to engage the knock-out pin and force it inwardly into the casing wherein the other end of the knock-out pin is axially aligned with the transverse flange 158 of the swivel member 150 to rotate the swivel member about the pivotal connections 152, 153. The cam ring 166 is slidably carried on the support bushing 128 and the cam portion may be variably circumferentially positioned with respect to the knock-out pin 174 by loosening the locking nut 170.

In operation the spindle is drivingly connected to a power source through the power input gear 70 and rotatably driven through the bushing 72, the power takeoff gear 74, the drive gear 40, the connecting sleeve 38, the drive sleeve 34 and the spindle drive shaft 32. The feed drive mechanism is actuated by a power source through power driven gear 76, the clutch mechanism, the power takeoff gear 78 and the jack nut gear 58 that rotates the jack nut 50 to axially displace the jack screw 48 and reciprocate the feed sleeve 14. Suitable power control mechanism (not shown) is provided to reverse the rotation of the jack screw to drive the slide sleeve in the opposite direction. The length of feed is controlled manually through the control button 130, the plunger 132, the ring member 136 and the control shafts 138, 140 or automatically by positioning the cam ring 166 so that the cam portion 178 will be rotated by the reduction gearing 162 into actuating contact with the knock-out pin 174 at a preselected feed depth. The maximum feed travel is controlled by the speed reduction gearing and is limited to 360° of rotation of the cam surface. An infinite number of feed depth settings less than the maximum feed depth can be set by loosening the locking pin 170 and rotating the cam ring 166 to position the cam portion 178 a lesser number of degrees of rotation from the knock-out pin 174. If it is desired to manually control the feed mechanism, the clutch may be disengaged by depressing the control button 130 to shift the ring member 136 and actuate the clutch operating pin 144. At this time the jack nut may be rotated manually by operation of the hand wheel 118 through the drive sleeve 20 and the drive gear 122. The spindle head unit is rotatable about the axis of rotation of the power gears 70, 76 within a locking plate 180 by actuation of a worm gear 182 fixed to the support plate 68. The concentric power transfer mechanism allows unlimited rotary movement of the spindle head relative to a spindle head support member (not shown) without interfering with a power transfer gear engagement with the power gears 70, 76.

Thus, it will be seen that an extremely compact spindle head has been disclosed having a minimum number of parts but none the less providing a maximum range of spindle control including both manual and automatic feed drives and, in addition, automatic feed control mechanism. Some variations may be made in the details of construction of the preferred embodiment hereinbefore described without exceeding the spirit of this invention, the scope of which is defined by the appended claims.

I claim:

1. In a power transfer mechanism for driving a machine tool, a housing member, a spindle slidably and rotatably supported within said housing, reciprocatory and rotative power transfer means concentrically mounted about and drivingly connected to said spindle within said housing member, separate concentrically mounted power driven means disposed transversely to and drivingly connected with said reciprocatory and rotative power transfer means within said housing member, clutch mechanism concentrically supported within said separate power driven means and interconnecting said reciprocatory power transfer means and one of said separate power driven means, and manual and power operable control mechanism associated with said clutch to disassociate said reciprocatory power transfer means and said one of said separate power driven means.

2. Drive mechanism for a machining tool comprising a tubular casing provided with a power access opening extending transversely of said casing and a control opening axially aligned with said power access opening, a power source including means to rotate and translate said machining tool, a spindle rotatably and reciprocably supported within said casing, first drive gear means interconnecting said power source and said spindle to impart a rotational cutting motion and a reciprocatory feed motion to said machining tool, a manual feed control mechanism for imparting reciprocatory feed motion to said tool supported in said control opening and extending within said casing, second drive gear means interconnecting said manual control mechanism and said spindle to impart a reciprocatory feed motion to said tool, clutch means mounted in said power access opening to alternately disengage said first drive gear means, clutch control means mounted centrally of said manual feed control mechanism in said control opening, and a link member pivotally mounted about said spindle and interconnecting said clutch means and said clutch control means.

3. The apparatus as defined in claim 2 and having a feed control cam mounted in said control opening, a cam follower interposed between said cam control and said link, a portion of said cam adapted to move said follower into clutch disengaging actuation with said link, and manual means to deactivate said cam control.

4. The apparatus as defined in claim 3 and having a portion of said cam contoured to effect clutch controlling actuation of said cam follower, means to manually adjust the circumferential position of said portion of said cam to vary the length of feed movement required to engage said portion and said follower to deactivate said power feed drive mechanism.

5. A machining tool drive mechanism comprising a tool holder, spindle means connected to said tool holder for imparting a rotary motion thereto, feed means connected to said tool holder for imparting a reciprocatory movement thereto, a longitudinal housing common to said spindle means and said feed means and having transverse access openings, power driven means for said spindle means and said feed means extending through one of said openings and drivingly associated with said spindle means and said feed means, clutch means interposed between said power driven means and said feed means, manually driven means drivingly associated with said feed means, manually operable clutch control mechanism extending through another of said openings, and means controllably interconnecting said clutch means and said manually operable clutch control mechanism whereby said power driven means may be disassociated from said feed means.

6. A tool holder supported on one end of a power rotatable shaft, connecting means drivingly linking the other end of said shaft and a power transmitting annulus concentrically mounted and radially spaced from said shaft, a gear train connecting said power transmitting annulus to transverse hollow power driven shaft means, transverse power driven shafting supported internally of said hollow power driven shaft means, screw feed mechanism supported internally of said power transmitting annulus, gear means interconnecting said transverse power driven shafting and said screw feed mechanism, a clutch mechanism supported internally of said transverse hollow power driven shafting and interconnecting said transverse power feed shafting, a hollow reciprocable feed sleeve connecting said screw feed mechanism and said tool holder and rotatably supporting said rotatable shaft, a common casing slidably supporting said hollow feed sleeve and rotatably supporting said power transmitting sleeve and having transverse access openings radially spaced and axially aligned between said ends of said shaft, power driven means associated with said power driven shafting through one of said access openings, a manually operable hollow feed drive shaft extending through another of said openings, gearing interconnecting said feed drive shaft and said screw mechanism, clutch control linkage supported in said hollow feed drive shaft, a ring member movably supported and radially spaced about said power rotatable shaft and said screw feed mechanism and controllably associated with said clutch control linkage, and means connecting said clutch and said ring member to manually engage and disengage said clutch.

7. A machining tool drive mechanism comprising a tool holder, spindle means connected to said tool holder for imparting a rotary motion thereto, feed means connected to said tool holder for imparting a reciprocatory movement thereto, a longitudinal housing common to said spindle means and said feed means and having transverse access openings, power driven means for said spindle means and said feed means extending through one of said openings and drivingly associated with said spindle means and said feed means, clutch mechanism interposed between said power driven means and said feed means comprising a power transferring shaft supported internally of said power driven means, one end of said shafting inwardly extending through said one opening and provided with a central axially extending opening, a spring member seated in said opening, a control member seated on said spring in said opening, the extremity of said one end of said shaft being of reduced diameter to provide a radially outwardly extending transverse surface, a plurality of transverse openings extending from said central opening through said extremity of said one end, radially movable members seated in said transverse openings and having a radial dimension greater than the radial distance between said central opening and the outer periphery of the reduced extremity of said one end of said shaft, an outer clutch member having a central opening extending therethrough and axially aligned with said central opening of said shaft, a recessed portion of said outer clutch member extending radially outwardly from said central opening and providing a peripheral axially extending flange radially spaced beyond said shaft and axially extending outwardly beyond and in overlapping relation to said extremity of said shaft, a plurality of pockets formed on the inner periphery of said flange in axial and peripheral spaced alignment with said transverse holes, roller means seated in said pockets and having a radial dimension sufficient to bind said shaft and said outer clutch member in driving engagement when said control member and said radially movable members and said roller members are axially aligned, a control rod reciprocably supported in said central opening of said outer clutch member and engageable with said control member to compress said spring and axially move said control member out of clutch engaging alignment with said ball members and said radially movable members, manually operable clutch control mechanism extending through another of said openings, and link means interconnecting said control rod means and said manually operable clutch control mechanism whereby said power driven means may be disassociated from said feed means.

8. The apparatus as defined in claim 7 and wherein said link means comprises a ring member radially spaced from and circumscribing said spindle, means to pivotally support said ring therearound, means interconnecting said ring member with said control rod and said manually operable clutch control mechanism, and the radial spacing of said ring member from said spindle being greater than the clutch operating reciprocating distance of said control rod.

9. The apparatus as defined in claim 7 and having a cam member rotatably mounted in said other access opening, a ring gear drivingly associated with said cam member, a manually operable feed drive gear mounted in said other access opening and drivingly associated with said screw feed mechanism, reduction gearing interconnecting said manually operable drive gear and said ring gear, a cam follower associated with said cam member and controllably linked to said clutch control means whereby said clutch may be disengaged after a predetermined length of feed travel.

10. The apparatus as described in claim 9 and having a portion of said cam member contoured to effect clutch controlling actuation of said cam follower, means to manually adjust the circumferential position of said portion of said cam member to vary the length of feed movement required to engage said portion and said follower to deactivate said feed drive mechanism.

11. Drive mechanism for a machining tool comprising a longitudinal casing having opposite aligned transverse access openings, a rotatable spindle longitudinally supported in said casing, feed mechanism longitudinally supported in said casing and concentrically mounted about said spindle, power drive means connected to said spindle and said feed mechanism through one of said openings, clutch means associated with said power drive means in said casing, clutch control mechanism mounted in the other of said openings and centrally aligned with the central axes of said spindle and said feed mechanism, a ring member circumscribing said feed mechanism and linking said clutch and said clutch control mechanism, and means permitting axial clutch controlling movement of said ring member radially outwardly of said feed mechanism and said spindle.

12. In a power transfer mechanism for driving a machine tool, a housing member, a spindle slidably and rotatably supported within said housing, reciprocatory and rotative power transfer means concentrically mounted about and drivingly connected to said spindle within said housing member, separate concentrically mounted power driven means drivingly connected with said reciprocatory and rotative power transfer means within said housing member, clutch mechanism concentrically supported within said separate power driven means and interconnecting said reciprocatory power transfer means and one of said separate power driven means, and control mechanism associated with said clutch to disassociate said reciprocatory power transfer means and said one of said separate power driven means.

13. In a power transfer mechanism for driving a machine tool, a housing member, a spindle slidably and rotatably supported within said housing, reciprocatory and rotative power transfer means concentrically mounted about and drivingly connected to said spindle within said housing member, separately operable concentrically mounted power driven means disposed transversely to and drivingly connected with said reciprocatory and rotative power transfer means within said housing member, clutch mechanism concentrically supported within said separate power driven means and interconnecting said reciprocatory power transfer means and one of said separate power driven means, and control mechanism associated with said clutch to disassociate said reciprocatory power transfer means and said one of said separate power driven means.

14. Drive mechanism for a machining tool comprising a tubular casing provided with a power access opening and a control opening extending transversely of said casing, a power source including means to rotate and translate said machining tool, a spindle rotatably and reciprocably supported within said casing, first drive gear means interconnecting said power source from said spindle to impart a rotational cutting motion and a reciprocatory feed motion to said machining tool, a manual feed control mechanism for imparting reciprocatory feed motion to said tool supported in said control opening and extending within said casing, second drive gear means interconnecting said manual control mechanism and said spindle to impart a reciprocatory feed motion to said tool, clutch means mounted in said power access opening to alternately disengage said first drive gear means, clutch control means mounted centrally of said manual feed control mechanism in said control opening, and a link member interconnecting said clutch means and said clutch control means.

15. A tool holder supported on one end of a power rotatable shaft, connecting means drivingly linking the other end of said shaft and a power transmitting annulus concentrically mounted and radially spaced from said shaft, an independently operable gear train connecting said power transmitting annulus to transverse hollow power driven shaft means, transverse power driven shafting supported internally of said hollow power driven shaft means, screw feed mechanism supported internally of said power transmitting annulus, independently operable gear means interconnecting said transverse power driven shafting and said screw feed mechanism, a hollow reciprocable feed sleeve connecting said screw feed mechanism and said tool holder and rotatably supporting said rotatable shaft, a common casing slidably supporting said hollow feed sleeve and rotatably supporting said power transmitting sleeve and having a transverse access opening, and power driven means associated with said power driven shafting through said access opening.

16. Drive mechanism for a machining tool comprising a longitudinal casing having a pair of aligned transverse access openings, an independently operable rotatable spindle longitudinally supported in said casing, independently operable feed mechanism longitudinally supported in said casing and concentrically mounted about said spindle, independently operable power drive means connected to said feed mechanism through one of said openings, clutch means aligned with said power drive means in said casing, separate manually and automatically operated clutch control mechanisms mounted in the other of said openings and being centrally aligned with the central axis of said power drive means, a connecting element spaced radially outwardly of said spindle and feed mechanism and linking said clutch and each said clutch control mechanisms, and means permitting axial clutch controlling movement of said connecting element relative to said power drive means to disengage said clutch.

References Cited in the file of this patent
UNITED STATES PATENTS

| | | |
|---|---|---|
| 1,023,722 | Cluts et al. | Apr. 16, 1912 |
| 2,887,906 | Grinage | May 26, 1959 |
| 2,893,272 | Linsker | July 7, 1959 |